United States Patent
Lanzillo et al.

(10) Patent No.: US 6,239,927 B1
(45) Date of Patent: May 29, 2001

(54) MIRRORED EAR GROOMING ACCESSORY APPARATUS

(76) Inventors: Robert Lanzillo, 840 Main St., Woburn, MA (US) 01801; Audrey Lanzillo, 1509 N. Shore Rd., Revere, MA (US) 02151

( * ) Notice: Subject to any disclaimer, the term of this patent is extended or adjusted under 35 U.S.C. 154(b) by 0 days.

(21) Appl. No.: 09/475,171

(22) Filed: Dec. 30, 1999

(51) Int. Cl.$^7$ .................................................. G02B 7/182
(52) U.S. Cl. ......................... 359/871; 359/872; 359/879; 359/880
(58) Field of Search ................................. 359/871, 872, 359/879, 880

(56) References Cited

U.S. PATENT DOCUMENTS

| | | | |
|---|---|---|---|
| 3,988,058 | * 10/1976 | Chaney et al. | 248/481 |
| 4,997,056 | * 3/1991 | Riley | 181/136 |
| 5,020,629 | * 6/1991 | Edmundson et al. . | |
| 5,501,652 | * 3/1996 | Woods . | |
| 5,513,502 | * 5/1996 | Seaton, Jr. | 63/14.1 |
| 5,997,165 | * 12/1999 | Lehrer | 362/581 |
| 6,027,219 | * 2/2000 | Arambulo | 359/872 |
| 6,030,085 | * 2/2000 | Leam et al. | 359/871 |

FOREIGN PATENT DOCUMENTS

| | | | | |
|---|---|---|---|---|
| 1943315 | * | 5/1970 | (DE) | 359/880 |
| 0521372 | * | 5/1940 | (GB) | 359/879 |

* cited by examiner

*Primary Examiner*—Mohammad Sikder
(74) *Attorney, Agent, or Firm*—Lambert & Associates; Donald J. MacDonald; Gary E. Lambert

(57) ABSTRACT

An ear grooming accessory apparatus having a first mirror for use in conjunction with a second mirror comprises an ear attachment component for attaching the ear grooming accessory apparatus to an external portion of a user's ear. The first mirror having a reflective viewing side attached to the ear attachment component such that the reflective viewing side of the first mirror provides a reflective view of the user's external ear and ear canal wherein the ear grooming accessory apparatus is attached directly to the external portion of the user's ear with the ear attachment component and positionable to allow the user to look into the second mirror and reflectively view the outer ear and ear canal of their own ear via the first for and thus enable the user to safely and effectively self-groom their own ear. One embodiment of the present invention includes a light source located on the ear grooming accessory apparatus for illuminating the user's ear and ear canal.

13 Claims, 4 Drawing Sheets

MIRRORED EAR GROOMING ACCESSORY APPARATUS

BACKGROUND OF THE INVENTION

This invention relates to ear grooming accessory aids. More particularly, this invention pertains to a device that permits a user to self-groom their ears by allowing the user to observe their ear and ear canal.

The growth of hair in the ear canal is not uncommon. Although the amount of ear hair growth varies and is more prominent in certain sub-groups of the general population, i.e. older men, it is totally natural and commonplace. However, whether based on traditions, personal preferences or fashion/fads, many persons find the visible growth of ear hair undesirable. Those holding the opinion that visible ear hair is undesirable would just as soon rid themselves of their own ear hair. The problem encountered when trying to remove ear hair is that it is difficult for a person to clearly view the inside of their own ear. It is especially difficult to view the ear canal, the place where ear hair is most prone to grow. The problem arises because one's ears are located on the sides of their head. Attempts to view one's own ear by looking into a mirror proves to provide, at best, only marginal results since you must turn your head to the side to get a full reflection of your ear in the mirror. Of course, turning your head to the side also directs your eyes away from the mirror, thus the poor ear viewing results.

One possible solution to the problem of viewing your own ear, including for the purposes of grooming, is to allow someone else to groom your ears. This remedy does not solve the problem of viewing your own ear—it simply avoids the problem. Seeking the assistance of others to help groom the hair in your ears means involving others in what many consider a personal task. Therefore, many individuals would much rather perform such intimate and personal tasks alone.

Addressing the problem of viewing one's own ear for the purposes of grooming the hair growing therein is possible by using two mirrors. Most commonly, a person uses both a hand-held mirror and a free-standing mirror. This method too is a less than an ideal solution. Since a person resorting to such a method must necessarily hold a mirror with one hand while attempting to groom the ear with their other free hand, there exists the risk of self-inflicted injury. Another possible solution using two (or more) free-standing or hanging mirrors is cumbersome to effectuate.

There is disclosed in U.S. Pat. No. 5,501,652 a self-examination otoscope device that permits a user to view an eardrum and the external ear canal of their own ear. The disclosed device however is ill-suited for purposes of self-grooming of the ear canal and ear since the disclosed device must be (1) held by the user performing the self-examine and (2) the device effectively occludes the ear and ear canal, thereby preventing access to the ear canal and ear for the purpose of grooming.

Therefore, there exists a need to provide a device and method whereby an individual can easily, effectively and independently view their own ear canal and yet still have free use of their hands to self-groom their own ears.

SUMMARY OF THE INVENTION

Therefore, it is an object of the present invention to provide an ear grooming accessory apparatus that provides a reflective view of a user's ear and ear canal so to be used with an additional mirror, which the user may easily, safely and effectively groom their own ear.

It is also an objective of the present invention to provide an apparatus that is uncomplicated in its use and design such that the apparatus can be manufactured and provided to the consuming public at an affordable price.

It is also an objective of the present invention to provide an apparatus that provides a reflective view of an user's ear yet does not require the user to use their hands to hold the apparatus in the operable position, thereby effectively freeing the user's hands for the task of self-grooming their ears.

It is also an objective of the present invention to provide an apparatus that is easy to use such that the apparatus can be used individually and privately, without resorting to assistance from others.

The present ear grooming apparatus comprises a second mirror and an ear attachment component to be used in conjunction with an additional mirror. The mirror is attached to the ear attachment component. The ear attachment component is operably attached to or positioned on the user's outer ear such that the user can view a reflective view of their own ear and ear canal by viewing the reflective mirror of the present invention in the second mirror. The mirror and ear attachment component are appropriately sized to fit on the ear of the user. In one embodiment the ear attachment component and the mirror are fixedly coupled to each other. In other embodiments of the present invention, the mirror and the ear attachment component are adjustably coupled to each other, thereby allowing the user of the invention to vary the relative position of the mirror and the ear attachment component. The mirror of the present invention may also comprise a magnified mirror that provides a magnified reflective view.

The ear attachment component of this invention may also take on various configurations without departing from the scope of the present invention. Those skilled in the art of ear attachment devices are familiar with the variety of ear attachment components used to attach items to an ear. Such ear attachment components are often used in a wide variety of items, including jewelry, medical devices, etc. A typical embodiment of the present invention uses an ear clip to attach the ear grooming accessory of the present invention to the user's ear. The ear clip is operable between an open position and a closed position. In actual use, the ear clip is opened and then closed upon a portion of the user's ear. In this manner, the user's ear is inserted in between the opened ear clip and then the ear clip is securely closed upon the user's ear. The ear clip, like other embodiments of the ear attachment component, is preferably designed to be operably attached to a user's right ear and left ear with equal ease.

Still other embodiments of the present invention use an ear attachment component comprising an ear cuff that partially encircles a portion of the user's outer ear and frictionally grips the outer ear. One advantage of the embodiment using an ear cuff is that the ear cuff may be slidingly repositioned on the user's ear without removing the ear grooming accessory of the present invention from the user's ear.

Another embodiment of the present invention has an ear attachment component comprising a post and back. The post and back configuration is similar to those traditionally used in earrings for persons having pierced ears. A great advantage of this particular embodiment is the security with which the ear grooming accessory attaches to the user's ear.

The ear grooming accessory of the present invention may also incorporate a light source that improves the reflective view provide by the device. The reflective view of the user's ear and ear canal is improved since the included light source further illuminates the user's ear and ear canal. The ambient light near the user's ear may not necessarily provide the amount of light that the included ear grooming accessory light can provide. The included light source is capable of providing a directed source of light to the user's ear. The included light increases the amount of light striking the user's ear. The light source may comprise traditional miniature bulbs, light-emitting diodes, fiber optic delivered and/or contained light sources or other appropriately sized light sources. In one embodiment, the light is delivered to the ear grooming accessory device using a fiber optic cable. The fiber optic cable is then routed along the peripheral edge of the reflective mirror. The fiber optic cable used in this embodiment has the characteristics such that the light is contained within the fiber optic cable from the light source to the ear grooming accessory device while the fiber optic cable allows the light to pass through the fiber optic cable in the vicinity of the mirror. Thus, the area surrounding the mirror, the user's ear during operation, is illuminated by the remotely located light source.

DETAILED DESCRIPTION OF THE PREFERRED EMBODIMENT

Figure 1:
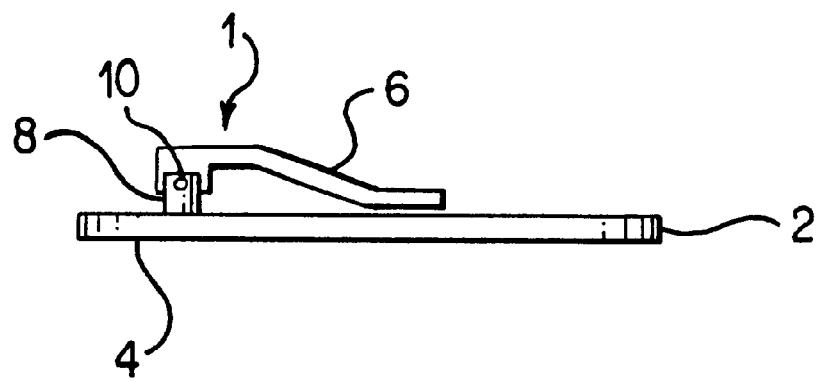
FIG. 1 is a side perspective view of an ear grooming accessory apparatus embodying the present invention.
Figure 2:
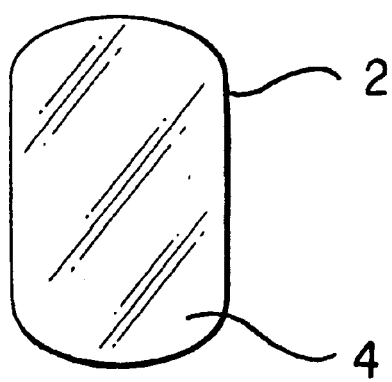
FIG. 2 is a front elevational view thereof.

A side perspective view of an ear grooming accessory apparatus 1 embodying the present invention is shown in FIG. 1. The present invention comprises a second mirror 2 attached to an ear attachment component, namely ear clip 6. The ear clip 6 is attached to the mirror 2 by post 8. The mirror 2 has a reflective side 4. The reflective side 4 provides a reflective view to the user during use of the device 1. A front elevational view of the reflective second mirror 2 can also be seen by referring the FIG. 2. The ear clip 6 can be moved between a closed position(shown) and an open position(not shown). The ear clip 6 pivots about pivot pin 10 to open and close. Typically, the ear clip is opened and then closed upon a portion of a user's ear for attachment thereto.

Figure 3:
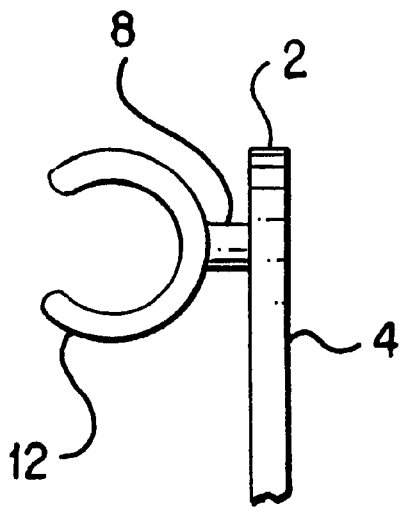
FIG. 3 is an embodiment of the ear grooming accessory apparatus of the present invention having an ear cuff ear attachment component.

The ear attachment component of the ear grooming accessory shown in FIG. 1, the ear clip 6, can also be in the form of an ear cuff 12 as depicted in FIG. 3. The ear cuff 12 attaches to a user's ear by partially encircling and frictionally gripping a user's ear.

Figure 4:
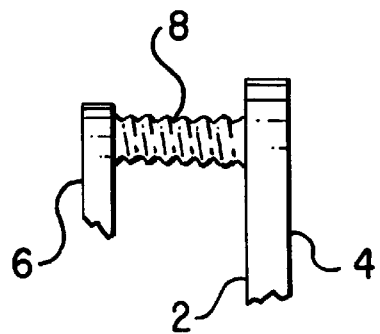
FIG. 4 is an embodiment of the present invention having a flexible and variably positional neck for varying the relative position of the ear attachment component and the mirror.

The post 8 in both FIG. 1 and FIG. 3 is used to connect the ear attachment component, ear clip 6 and ear cuff 12 respectively, to the mirror 2. As depicted in FIG. 1 and FIG. 3, the post is a short, fixed solid piece of material that couples the ear attachment component to the mirror 2. The length of post 8 may be varied during construction, depending on the amount of offset desired between the ear attachment component and the mirror 2. Alternatively, the ear attachment component may be attached directly to the reflective mirror 2. In another embodiment, the post may be flexible and positionable so that the user can adjustably vary the relative position between the ear attachment component and the mirror 2 as shown in FIG. 4.

Figure 5:
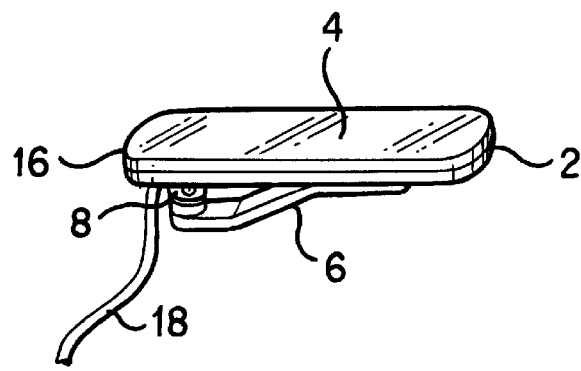
FIG. 5 is the ear grooming accessory apparatus of FIG. 1 further comprising a fiber optically delivered light source.
Figure 6:
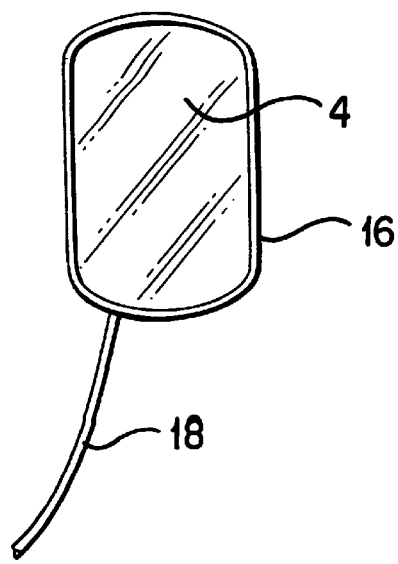
FIG. 6 is front elevational view thereof.

The preferred embodiment of the present invention also comprises an illuminating light incorporated into the ear grooming apparatus. The illuminating light source may be miniature bulbs, light-emitting diodes, fiber-optic light sources or other lighting methods and sources known to those skilled in the art. Both FIG. 5 and FIG. 6 both depict the ear grooming accessory apparatus of the present invention having a fiber-optic cable routed along the top peripheral edge of the of the mirror reflective surface 4. The fiber-optic cable portion 18 is connected to a suitable light source remotely located from the ear grooming accessory apparatus 1. The fiber-optic cable portion 18 characteristically facilitates the propagation of light from the remotely located light source to the ear grooming apparatus 1. The fiber-optic cable portion 16 that is routed along the top peripheral edge of the mirror reflective surface 4 characteristically permits the transmission of light through the fiber optic cable portion 16. In this manner, light from the remotely located light source is able to illuminate the area surrounding the mirror reflective surface 4. Since the mirror reflective surface is positioned to provide a reflective view of the user's ear and ear canal, the light emanating from the fiber-optic cable portion 16 illuminates the user's ear and ear canal.

Figure 7:
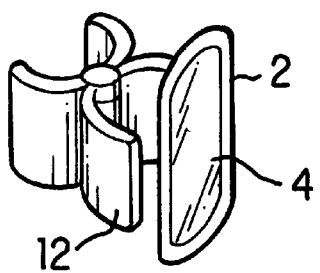
FIG. 7 is a perspective view of an embodiment of the ear grooming accessory apparatus of the present invention having an ear cuff ear attachment component.
Figure 8:
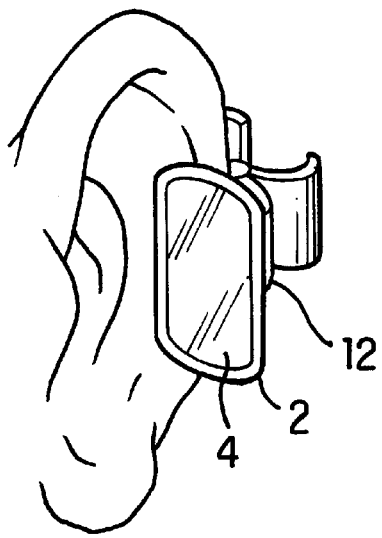
FIG. 8 shows the ear grooming accessory apparatus of FIG. 7 attached to the ear of a user.
Figure 9:
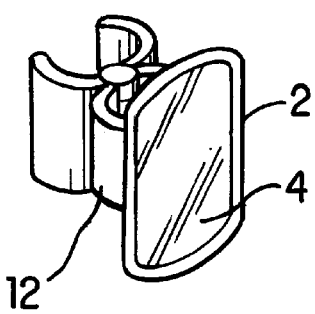
FIG. 9 is a perspective view of the ear grooming accessory apparatus of FIG. 7 in a closed position.
Figure 10:
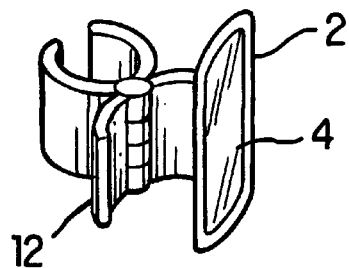
FIG. 10 is a perspective view of the ear grooming accessory apparatus of FIG. 7 in an open position.

FIGS. 7, 9, and 10 show an alternate embodiment of the present invention having a spring hinged ear cuff 12 designed to clip onto the ear of the user. Mirror 4 is attached to the spring hinged ear cuff 12. In FIG. 8, the spring hinged ear cuff is shown positioned on the ear of a user.

Figure 11:
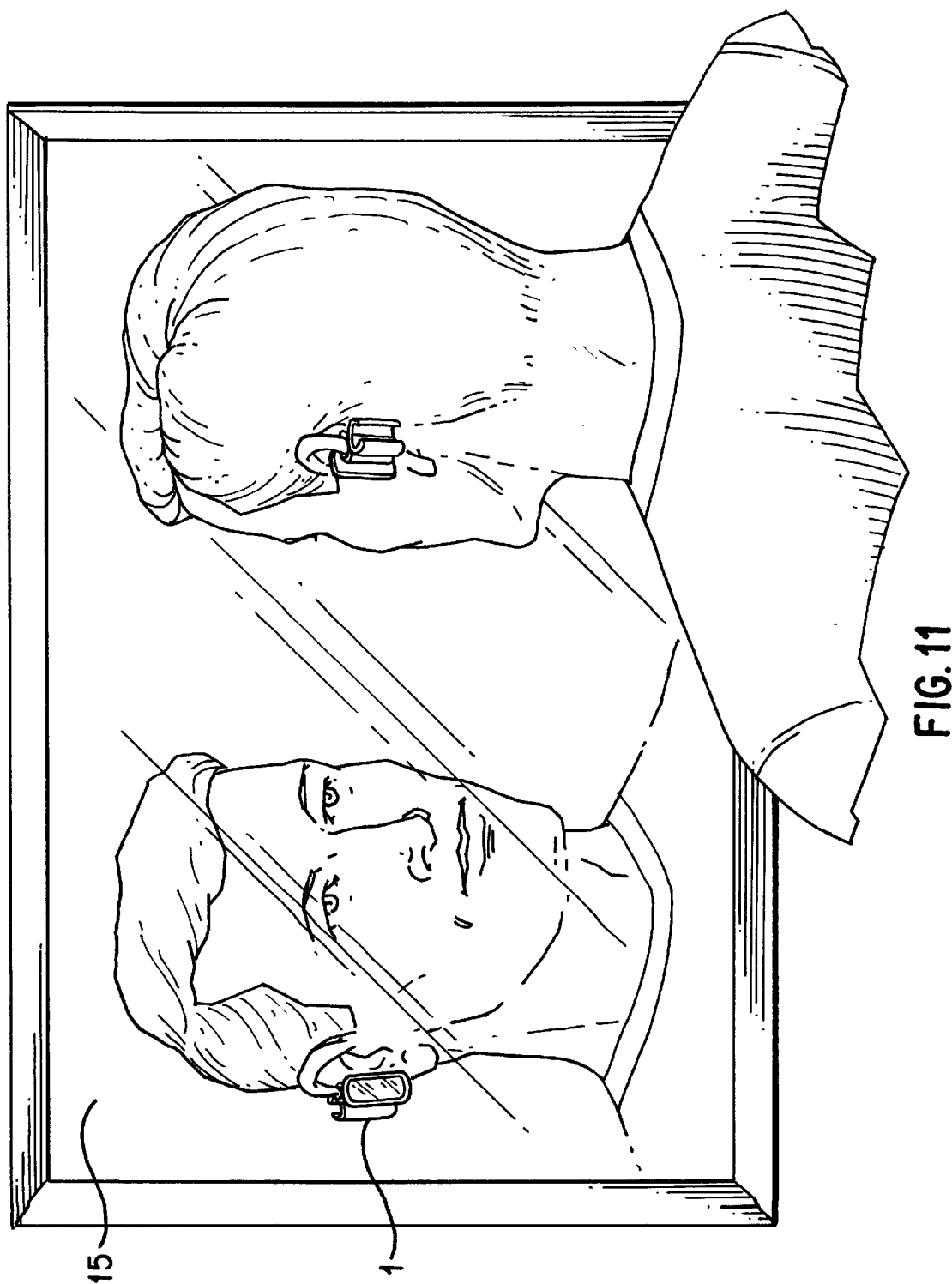
FIG. 11 shows the ear grooming accessory apparatus of FIG. 7 as used by a user in conjunction with an additional mirror.

FIG. 11 shows the chest and head of a user in front of additional mirror 15 having the present invention attached to the left ear of the user. FIG. 11 illustrates how the invention of the present invention is used in conjunction with additional mirror 15.

As such, the method of making and using the device detailed above constitutes the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these and other embodiments may be resorted to without departing from the invention. Therefore, the form of the invention set out above should be considered illustrative and not as limiting the scope of the following claims.

What is claimed is:

1. An ear grooming accessory apparatus having a first mirror for use in conjunction with a second mirror comprising:

an ear attachment component for attaching the ear grooming accessory apparatus to an external portion of an ear; and said first mirror having a reflective viewing side attached to said ear attachment component such that said reflective viewing side of said first mirror provides a reflective view of the user's external ear and ear canal;

wherein said ear grooming accessory apparatus is attached directly to the external portion of the user's ear with said ear attachment component and oriented to allow the user to look into said second mirror and reflectively view the outer ear and ear canal of their own ear via said first mirror and thus enable the user to safely and effectively self-groom their own ear.

2. The ear grooming accessory of claim 1 wherein said ear grooming attachment and said first mirror are coupled to each other by a rigid post.

3. The ear grooming accessory of claim 1 wherein said ear attachment component comprises an ear clip having a user selectable open position and a user selectable closed position for allowing the user to removably attach the ear grooming accessory apparatus on the user's ear.

4. The ear grooming accessory of claim 1 wherein said ear attachment component comprises an ear cuff that at least partially encircles and grips the outer portion of a user's ear.

5. The ear grooming accessory of claim 1 wherein said ear attachment component comprises a post and a back wherein said post is passed through the ear of a user and secured thereto with said back.

6. The ear grooming accessory of claim 1 wherein said ear attachment component is fixedly coupled to said fist mirror.

7. The ear grooming accessory of claim 1 wherein said ear attachment component is pivotally affixed to said first mirror.

8. The ear grooming accessory of claim 1 wherein said ear attachment component is attached to said fit mirror with flexible and positionable materials.

9. The ear grooming accessory of claim 1 wherein said ear attachment component operably attaches to the right ear and the left ear of a user with equal ease.

10. The ear grooming accessory of claim 1 wherein said first mirror is a magnifying mirror.

11. The ear grooming accessory of claim 1 further comprising an illuminating light source located on said ear grooming accessory.

12. The ear grooming accessory of claim 11 wherein said light is housed in a fiber-optic cable, at least some of which characteristically allows the passage of light for illuminating the area surrounding the ear grooming accessory apparatus.

13. The ear grooming accessory of claim 12 wherein said first mirror is a magnifying mirror.

* * * * *